United States Patent [19]

Crain et al.

[11] Patent Number: 4,538,222

[45] Date of Patent: Aug. 27, 1985

[54] APPARATUS AND METHOD FOR MIXING A PLURALITY OF SUBSTANCES

[75] Inventors: Stephen F. Crain; Steven H. Gray; Michael L. Green, all of Duncan, Okla.; Ronald A. Gibson, Camarillo, Calif.

[73] Assignee: Halliburton Company, Duncan, Okla.

[21] Appl. No.: 483,031

[22] Filed: Apr. 6, 1983

[51] Int. Cl.³ .................. G06F 15/46; G05D 11/13
[52] U.S. Cl. ..................................... 364/172; 137/88; 137/101.19; 222/52; 364/502; 364/510; 366/152
[58] Field of Search .............. 364/172, 180, 479, 509, 364/510, 502; 222/1, 52, 55, 57; 137/3, 88, 101.19, 101.21, 268; 366/151, 152

[56] References Cited

U.S. PATENT DOCUMENTS

| Re. 18,063 | 5/1931 | Steinhauer | 222/178 |
|---|---|---|---|
| 2,024,478 | 12/1935 | Short | 137/101.19 |
| 2,658,644 | 11/1953 | Lowe | 222/52 |
| 2,704,173 | 3/1955 | Edwards | 222/136 |
| 2,873,036 | 2/1959 | Noble | 214/2 |
| 3,027,099 | 3/1962 | Ludwig | 241/33 |
| 3,041,049 | 6/1962 | Tarukawa | 259/9 |
| 3,053,577 | 9/1962 | Ungashick | 408/67 |
| 3,115,278 | 12/1963 | Mylting | 222/56 |
| 3,181,482 | 5/1965 | Heth et al. | 107/4 |
| 3,219,046 | 11/1965 | Waugh | 137/8 |
| 3,245,584 | 4/1966 | Linville | 222/57 |
| 3,270,921 | 9/1966 | Nadolske et al. | 222/136 |
| 3,329,313 | 7/1967 | Mayer | 222/56 |
| 3,410,293 | 11/1968 | Ernyei | 137/112 |
| 3,452,774 | 7/1969 | Stanton | 137/101.19 |
| 3,475,392 | 10/1969 | McCoy et al. | 137/3 |
| 3,481,544 | 12/1969 | Jackson | 239/130 |
| 3,495,808 | 2/1970 | Klein et al. | 366/152 X |
| 3,536,235 | 10/1970 | Holzhauer et al. | 222/273 |
| 3,558,017 | 1/1971 | Soojian et al. | 222/342 |
| 3,566,355 | 2/1971 | Smith | 364/180 X |
| 3,605,775 | 9/1971 | Zaander et al. | 137/3 |
| 3,606,903 | 9/1971 | Porter et al. | 137/88 |
| 3,609,316 | 9/1971 | Brosset et al. | 364/479 |
| 3,648,032 | 3/1972 | Gineste | 364/180 |
| 3,721,253 | 3/1973 | Remke | 137/3 |
| 3,807,602 | 4/1974 | Meichsner | 222/1 |
| 3,807,701 | 4/1974 | Reid et al. | 366/152 X |
| 3,822,809 | 7/1974 | Foucault et al. | 222/71 |
| 3,843,099 | 10/1974 | Duncan | 259/23 |
| 3,964,793 | 6/1976 | Volpeliere | 222/55 |
| 4,037,598 | 7/1977 | Georgi | 364/510 X |
| 4,111,272 | 9/1978 | Ricciardi et al. | 177/50 |
| 4,111,335 | 9/1978 | Arya et al. | 222/57 |
| 4,111,336 | 9/1978 | Ward et al. | 222/58 |
| 4,209,258 | 6/1980 | Oakes | 366/152 |
| 4,265,266 | 5/1981 | Kierbow et al. | 137/101.19 |
| 4,345,612 | 8/1982 | Koni et al. | 137/101.19 |
| 4,353,482 | 10/1982 | Tomlinson et al. | 222/1 |

FOREIGN PATENT DOCUMENTS

| 637629 | 3/1962 | Canada . |
| 2626411 | 7/1977 | Fed. Rep. of Germany . |
| 1064761 | 10/1966 | United Kingdom . |
| 667957 | 4/1979 | U.S.S.R. . |

Primary Examiner—Joseph Ruggiero
Attorney, Agent, or Firm—E. Harrison Gilbert, III; Joseph A. Walkowski; Thomas R. Weaver

[57] ABSTRACT

A self-contained portable unit for producing a mixture of substances in response to two separate flows includes a portable trailer upon which a holding tank is mounted. Various additive channels are maintained on the trailer for introducing additives, at selectable concentrations or rates, into a first flow which occurs through an inlet conduit connected to an input of the holding tank. Connected to an output of the holding tank is an outlet conduit to which an external blender device can be connected. The trailer has additional additive channels contained thereon for introducing further additives, at selectable concentrations or rates, into a second flow between the holding tank and the external device. Control of the additives is maintained by a microcomputer-based controller or a manual, back-up controller, whichever is switchably selected for each additive channel.

14 Claims, 16 Drawing Figures

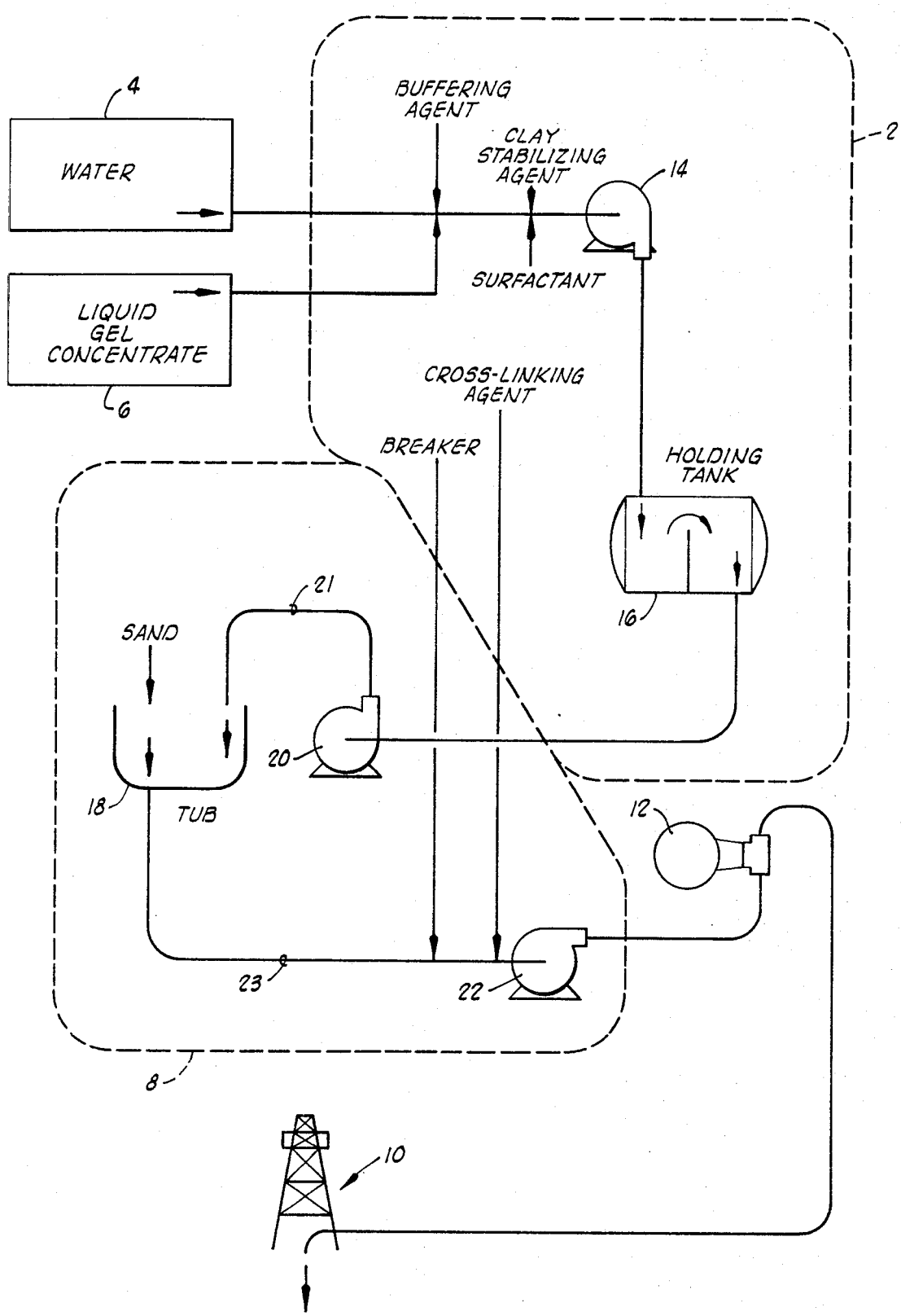

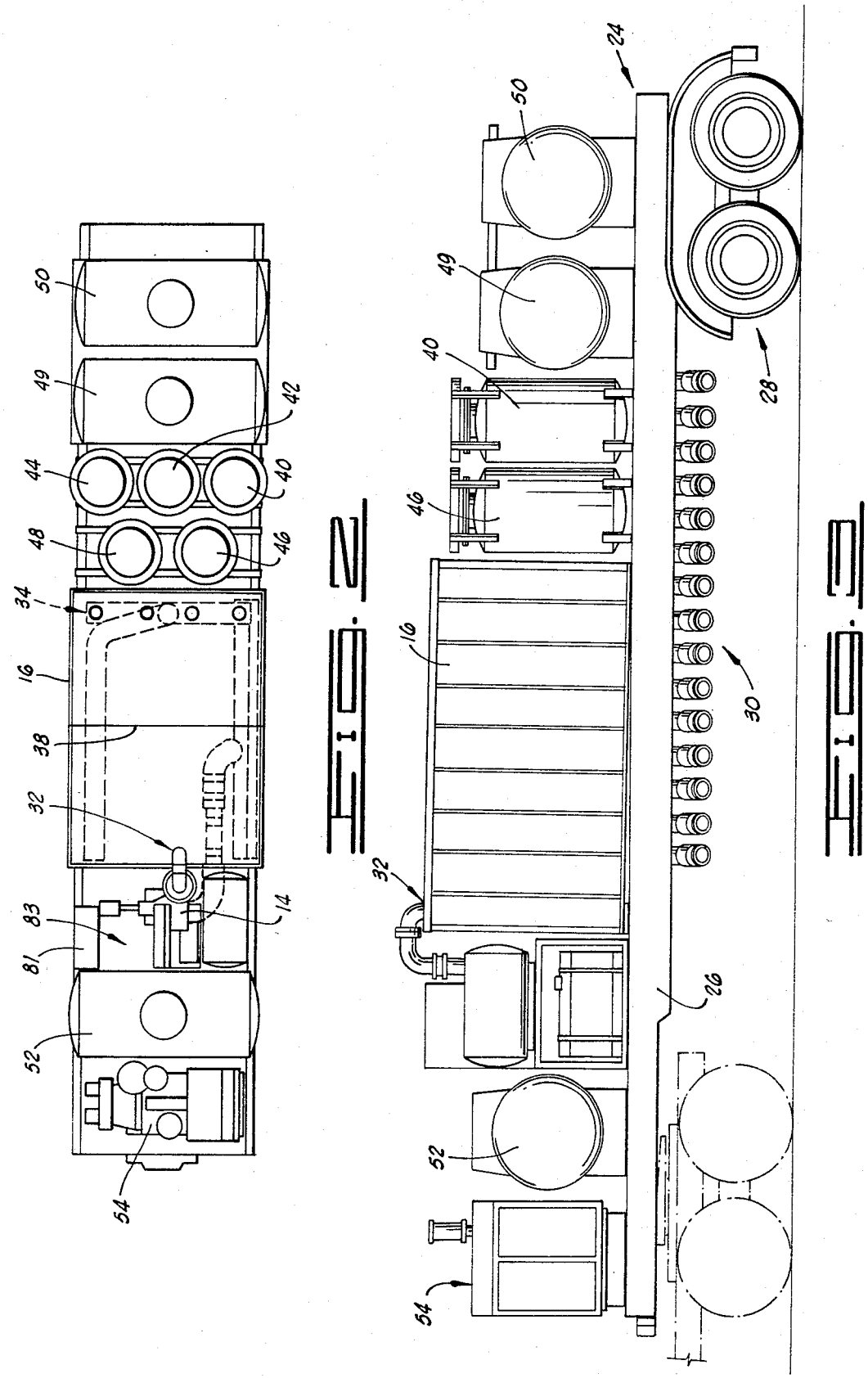

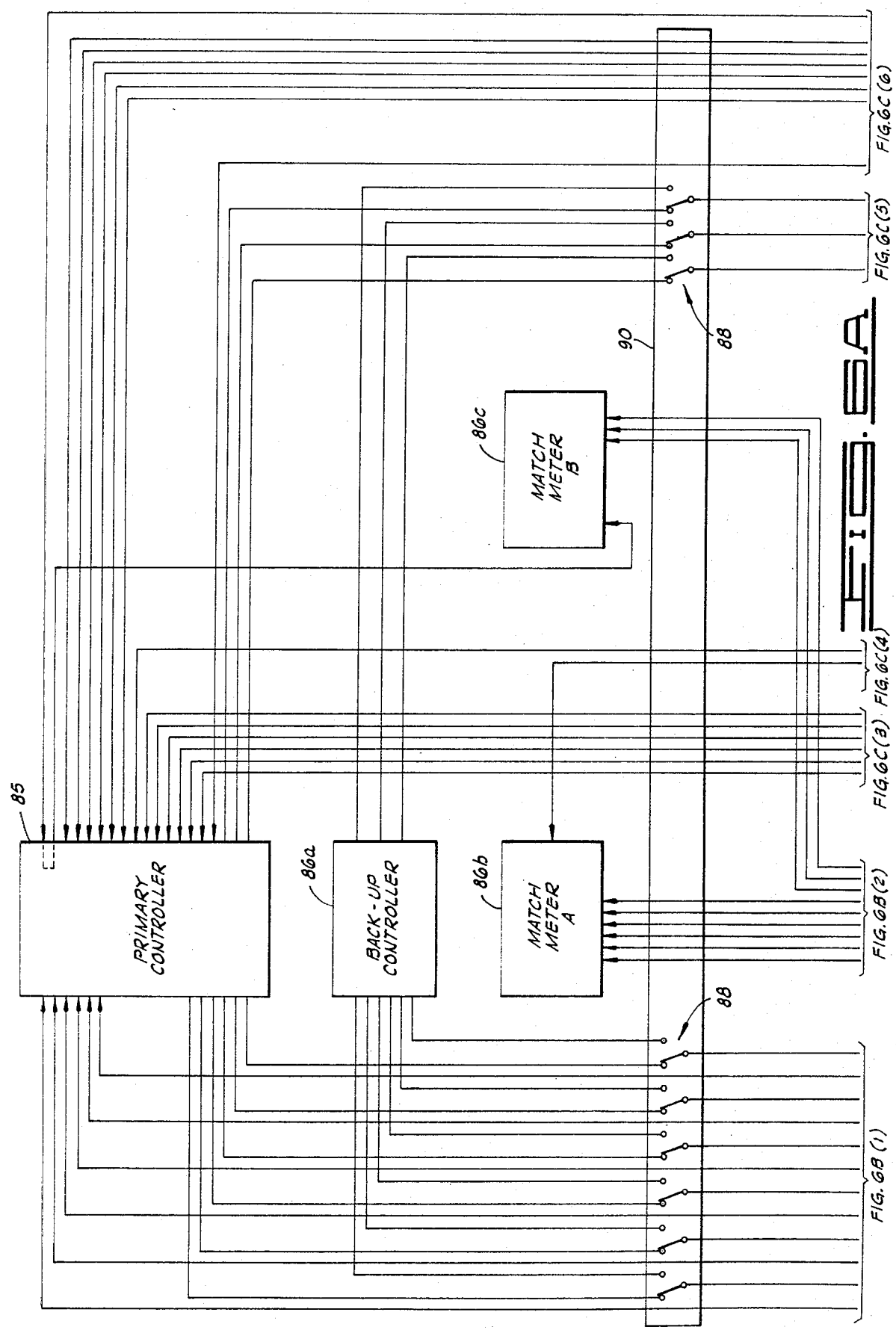

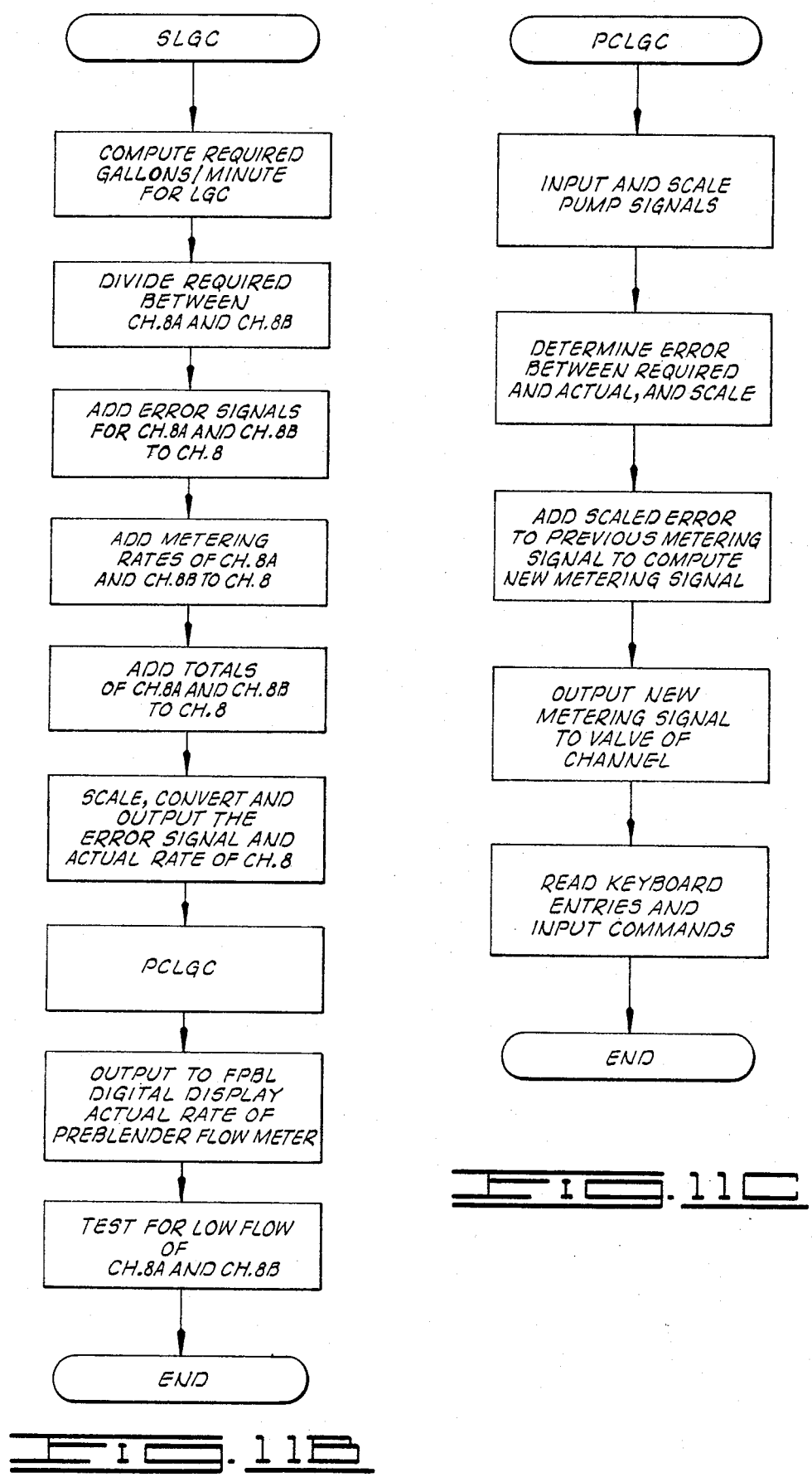

APPARATUS AND METHOD FOR MIXING A PLURALITY OF SUBSTANCES

This invention relates generally to apparatus and methods for mixing a plurality of substances and, more particularly, but not by way of limitation, to a liquid gel concentrate continuous blending trailer having an electrical control system located thereon for controlling the production of a fracturing gel.

The necessity for the proper control of the blending of substances used in the drilling and completing of oil or gas wells has been recognized as set forth in U.S. Pat. No. 4,353,482 to Tomlinson et al. It is also known that additive substances used in the oil and gas industry can be contained on and transported by a portable trailer as disclosed in U.S. Pat. No. 4,265,266 to Kierbow et al. Despite the recognition of these needs and the disclosures of apparatus to meet these needs, there has arisen a more specific need for an improved self-contained portable unit and method which control the preparation of a fracturing fluid containing a liquid gel concentrate. With such an apparatus and a method for controlling the preparation of a fracturing fluid, the considerable time spent pre-gelling a job can be decreased, the running time and associated wear on blenders can be reduced, and waste (and the costs associated therewith) can be cut. Additionally, viscosity, which is important to the ability of the fluid to carry sand, can be carefully controlled.

The improved self-contained unit and method should be able to satisfy three basic criteria:

1. mix a liquid gel concentrate, and preferably other additives (such as a buffering agent), with water to form a fully yielded gel capable of carrying high sand concentrations;
2. store liquid chemical additives in bulk quantities in a closed system; and
3. meter additional additives with a minimum of hand manipulation and error.

The first criterion requires an apparatus and method for drawing water from a water source, adding liquid gel concentrate and other necessary chemicals, and then allowing sufficient holding time for the gel to fully yield. The mixture is to be held until it has fully yielded so that very high sand concentrations can be added in a blender tub into which the mixture is pumped. To allow the mixture to fully yield, there is the need for a holding tank having a sufficient capacity to meet the flow rate at which the mixture is to be pumped while allowing adequate reaction time. However, it is also desirable for the holding tank to hold only a minimum mixture so that in the event of a premature sandout, for example, only a minimum amount of mixture will need to be discarded.

The second criterion of bulk storage of liquid chemical additives is needed for containing surfactants, clay stabilizing agents, cross-linking agents, breakers, pH control (buffering) agents and other additives. By maintaining these substances in bulk on the self-contained unit, spillage waste from drums will be eliminated, on-location labor requirements will be decreased, and bulk purchasing economies will be allowed.

Maintaining bulk quantities on the self-contained unit in a closed system reduces safety hazards which can arise from handling 55-gallon drums in which the additives would otherwise be frequently maintained. For example, formic acid, which is used in oil and gas well operations, is a particularly hazardous chemical to handle under field conditions. By utilizing a closed system having a bulk tank reduces the potential for inadvertent human contact with the formic acid.

The use of a closed bulk storage system on the self-contained unit also minimizes wastes which would otherwise likely occur if individual storage drums were used. For example, when individual drums are used, significant monetary loss occurs if the entire drum contents are not used because each gallon of additive can cost from $20.00 to $50.00, for example. A self-contained closed system can also prevent waste by allowing more accurate inventory control of the chemicals.

The third criterion of metering additional additives with a minimum of hand manipulation and error necessitates a suitable metering system capable of metering various flows in response to different master flows without the continual monitoring by an operator. Accurate control of each of these additives must be continually maintained because of fluctuations in the master and additive flows. If exclusively manual metering were used, these fluctuations could result in a gel that is not fully yielded, thereby resulting in the blender tub sanding out or the pumping system being damaged, because the manual operation would likely not be able to achieve the necessary response.

With an improved apparatus and method which meets the aforementioned needs, a proper fracturing fluid can be obtained within a reduced time.

The present invention satisfies the aforementioned requirements by providing a new and improved apparatus and method for mixing a plurality of substances. In particular, the present invention provides an apparatus and method for producing a fracturing gel from a liquid gel concentrate, a buffering agent and water. Other additives can also be included. This is accomplished by metering the additives into a water stream, thoroughly mixing the substances, and pumping them into a holding tank to allow the mixture to properly react and yield (e.g., by hydration of the gelling agent in the liquid gel concentrate). The fully yielded mixture is then pumped into a blender tub from which a flow into a well is achieved. The present invention is also capable of adding further additives to the mixture as it passes from the blender tub into the well. The present invention includes the necessary control means for properly metering the additives into their respective primary flows, such as the mixture flow into the holding tank and the flow from the the blender tub.

The apparatus of the present invention broadly includes support means for being transported, a holding tank mounted on the support means, first container means mounted on the support means, second container means mounted on the support means, inlet conduit means mounted on the support means for providing a flow path to the holding tank, outlet conduit means mounted on the support means for providing a flow path from the holding tank, first connector means mounted on the support means for providing a flow path from the first container means to the inlet conduit means, second connector means mounted on the support means for providing a flow path from the second container means, and control means for controlling, in response to a flow through the inlet conduit means, the flow of a first additive from the first container means into the inlet conduit means and for controlling, in response to a flow through the outlet conduit means, the flow of a second additive from the second container means.

The control means includes digital means for automatically controlling the first and second connector means to move the respective additives in the associated container means through the respective flow paths at automatically determined rates by which preselected concentrations of the additives will be achieved in the resultant mixture. The control means also includes analog means for controlling the first and second connector means to move the respective additives at manually selected rates. The control means still further includes switch means for selecting which of the digital means or the analog means is to control the first connector means and the second connector means.

The control means also includes match meter means for visually indicating the relationships between the actual speeds at which the first and second connector means move the respective additives and the respective preselected rates.

The control means still further includes means for detecting the pH of a substance flowing through the inlet conduit means into the holding tank.

The method of the present invention for producing a fracturing fluid comprises the steps of flowing water through a conduit, actuating a first pump to flow a liquid gel concentrate into the conduit, actuating a second pump to flow a buffering agent into the conduit, detecting the rate the water flows through the conduit, detecting the speed at which the first pump is actuated, detecting the speed at which the second pump is actuated, computing in response to the detected rate of the water and the detected speeds of the first and second pumps a total flow of a mixture of the water, liquid gel concentrate, and buffering agent through the conduit, entering a concentration value for the liquid gel concentrate, entering a concentration value for the buffering agent, controlling the step of actuating the first pump in response to the total flow, the speed at which the first pump is actuated, and the concentration value for the liquid gel concentrate, controlling the step of actuating the second pump in response to the total flow, the speed at which the second pump is actuated, and the concentration value for the buffering agent, flowing the mixture into a holding tank, flowing the mixture from the holding tank and into a blender tub having an outlet line through which the mixture flows, actuating a third pump to flow an additional additive into the outlet line of the blender tub, detecting the rate the mixture flows from the holding tank into the blender tub, detecting the speed at which the third pump is actuated, entering a concentration value for the additional additive, and controlling the step of actuating the third pump in response to the rate at which the mixture flows from the holding tank into the blender tub, the speed at which the third pump is actuated, and the concentration value for the additional additive.

Therefore, from the foregoing, it is a general object of the present invention to provide a new and improved method and apparatus for mixing a plurality of substances. Other and further objects, features and advantages of the present invention will be readily apparent to those skilled in the art when the following description of the preferred embodiment is read in conjunction with the accompanying drawings.

FIG. 1 is a schematic flow diagram of the present invention shown associated with a water source, a liquid gel concentrate source, a blender, and a well.

FIG. 2 is a top plan view of a preferred embodiment of the self-contained unit of the present invention.

Figure 4:
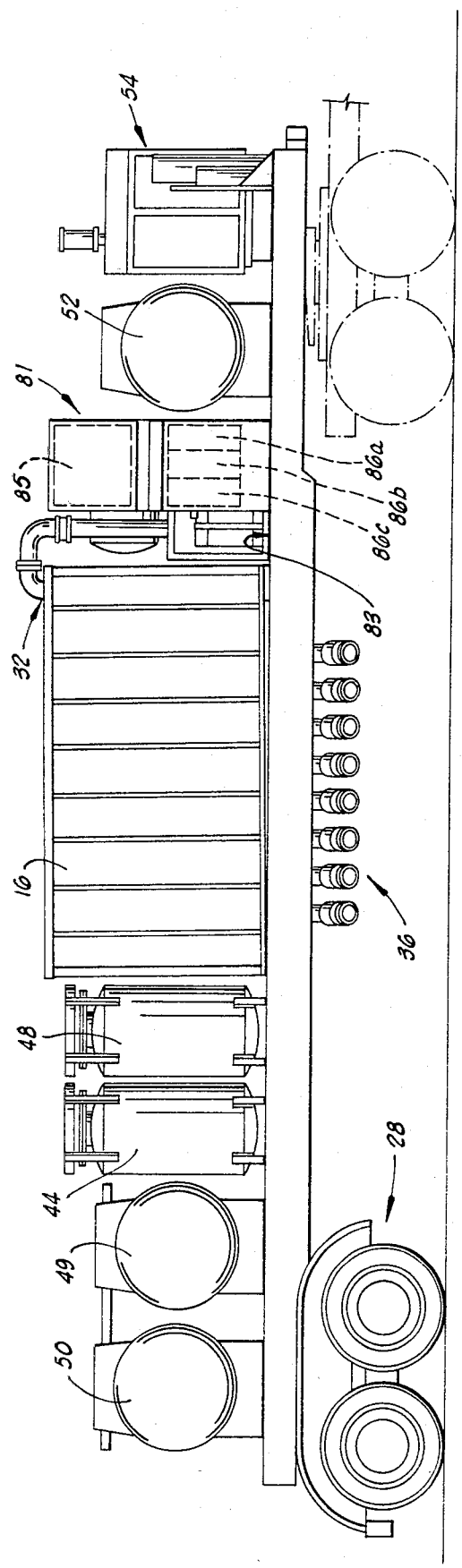
Figure 5:
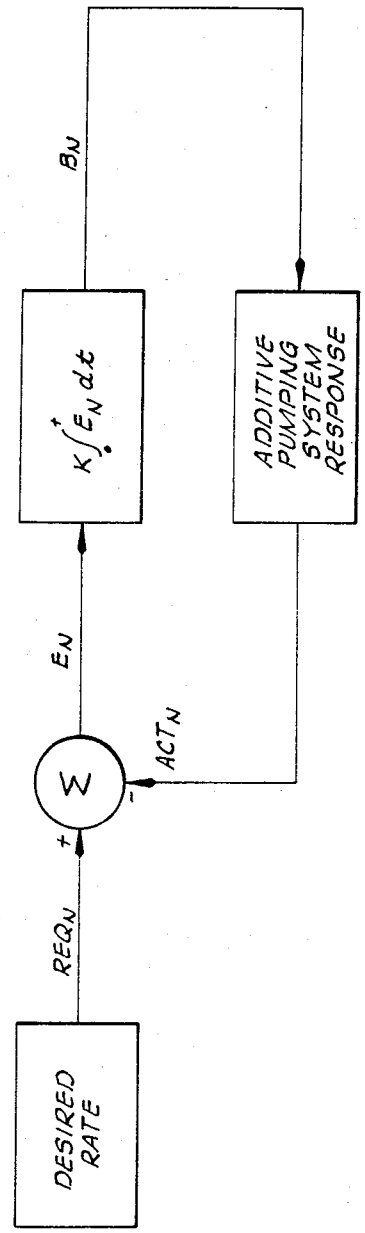
Figure 5:
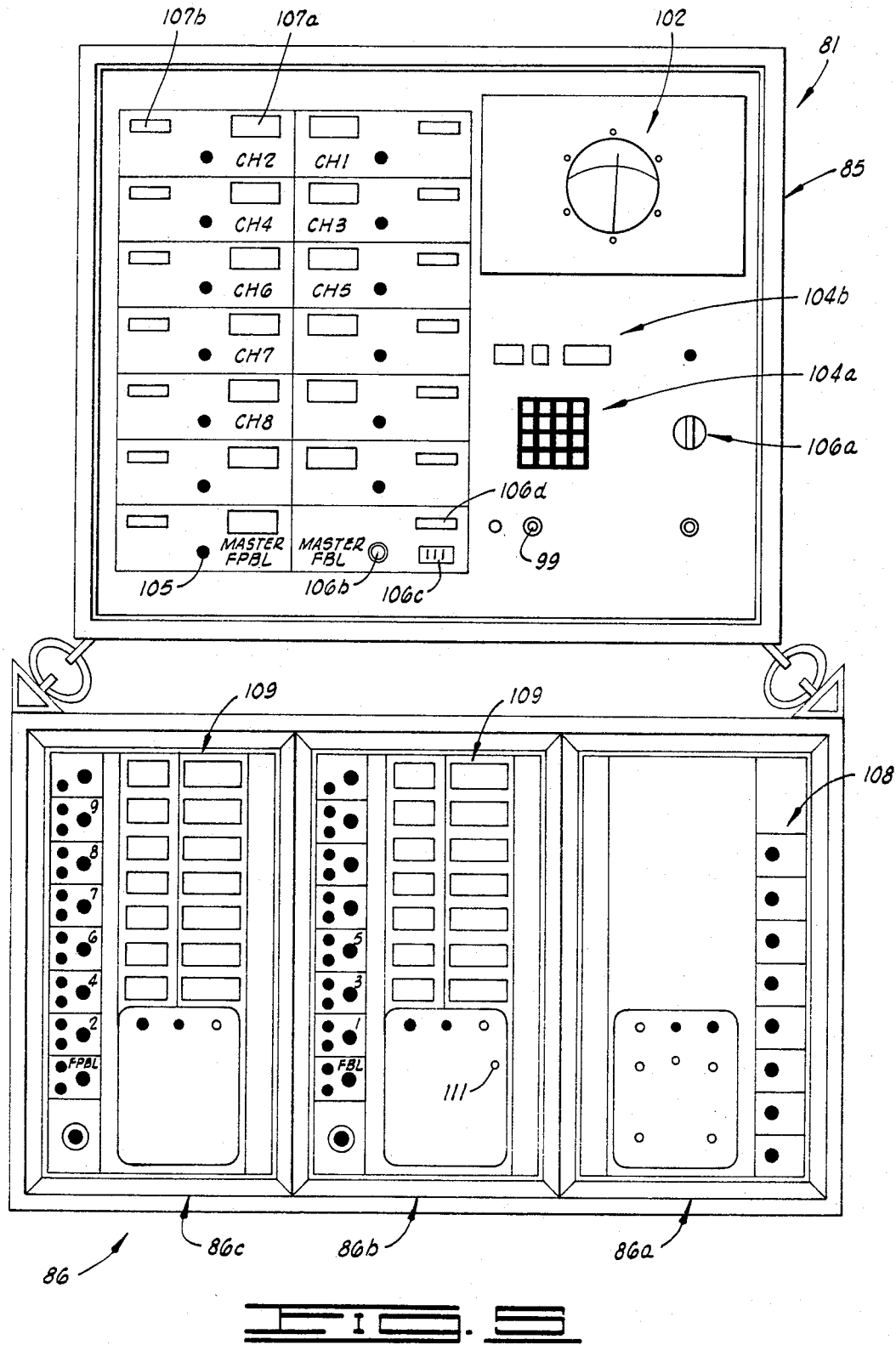

FIG. 3 is an enlarged first side elevational view of the self-contained unit shown in FIG. 2. FIG. 4 is an enlarged second side elevational view of the self-contained unit shown in FIG. 2. FIG. 5 is a front view of the control panel of the control system of the preferred embodiment of the present invention.

Figure 6B:
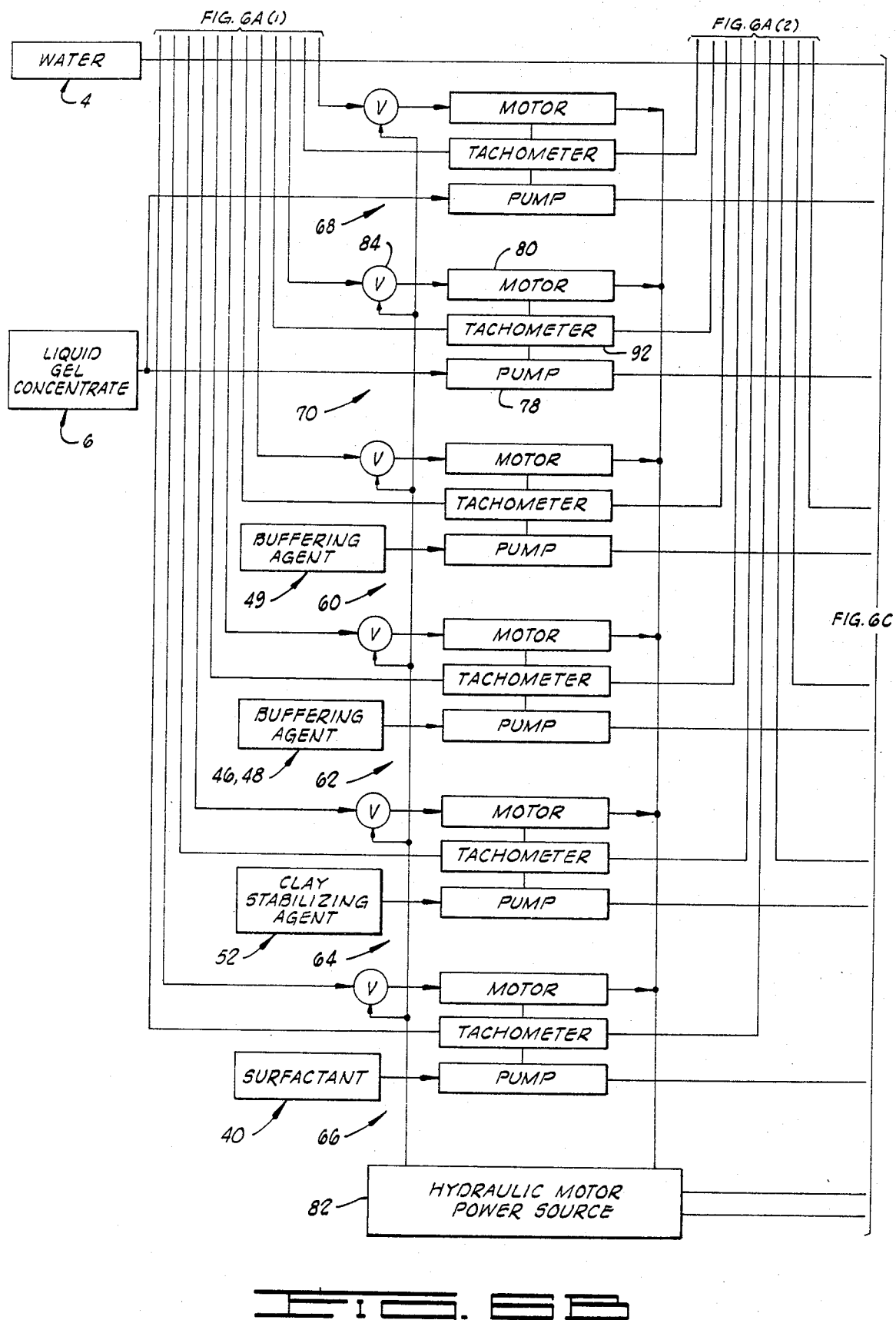
Figure 6C:
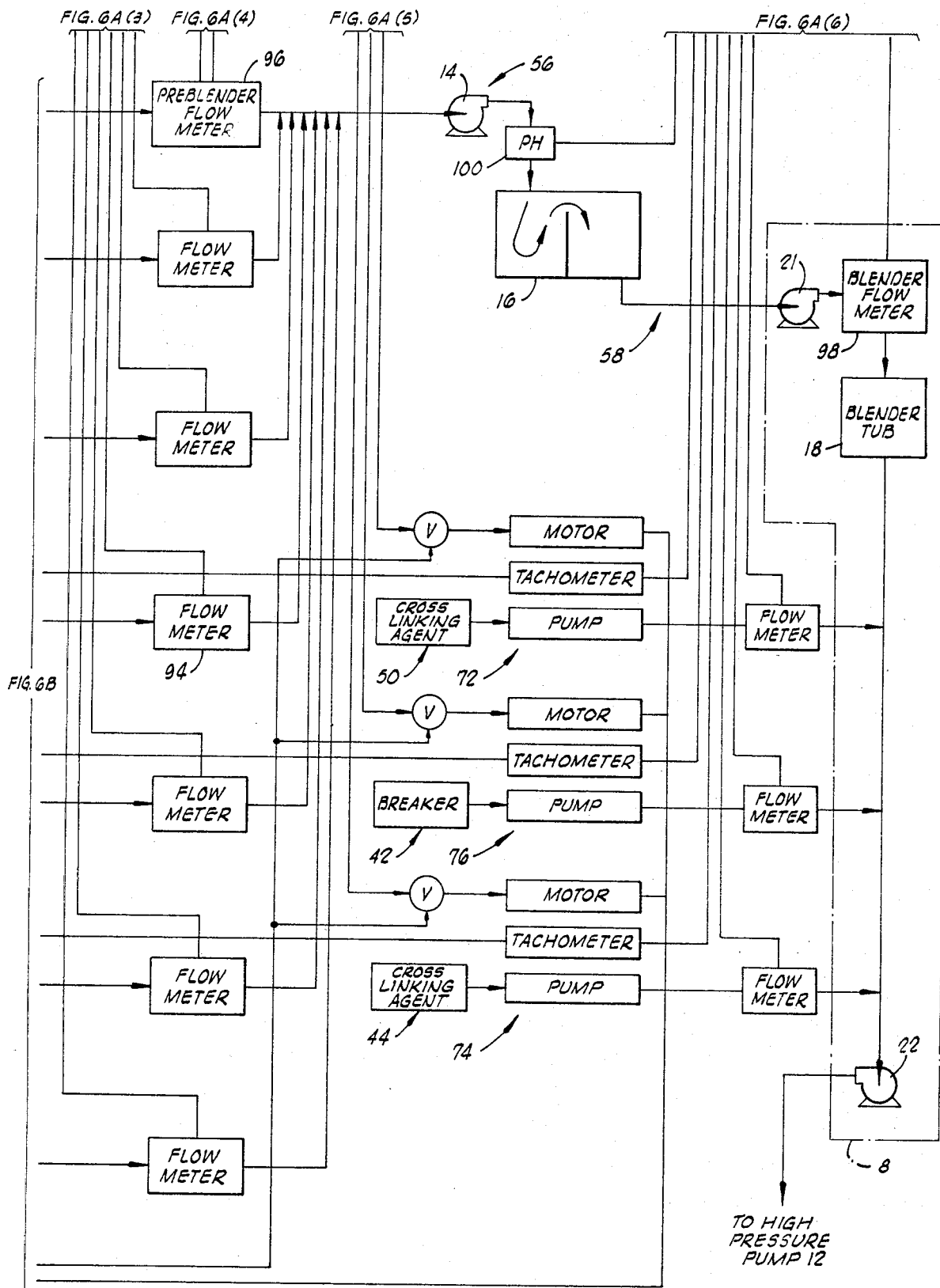

FIGS. 6A-6C form a functional block diagram and flow chart of the metering system of the preferred embodiment of the present invention.

Figures 7, 9:
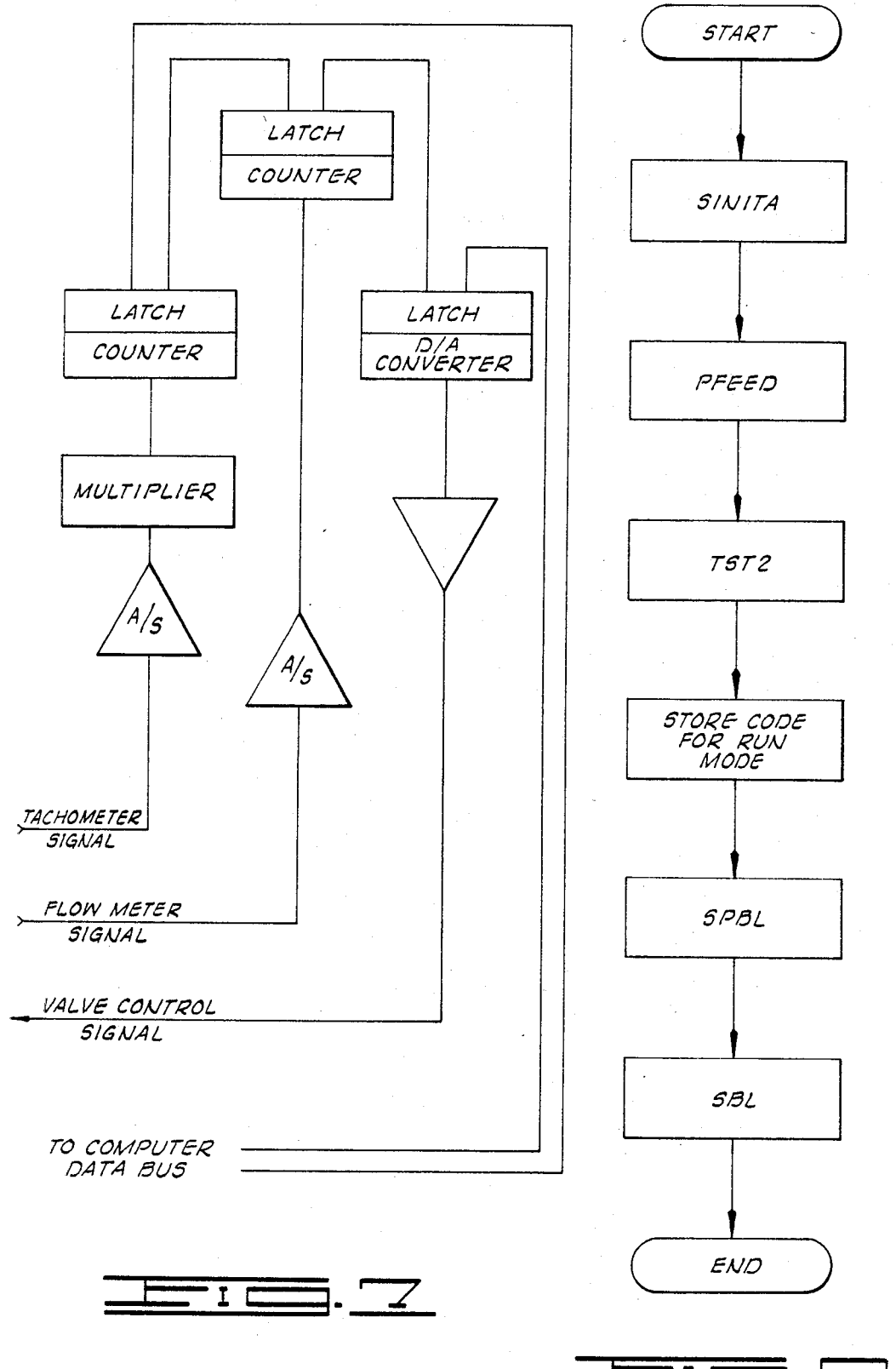

FIG. 7 is a schematic diagram of the input and output of each liquid additive channel of the preferred embodiment of the present invention.

FIG. 8 is a diagram of the basic control loop of the preferred embodiment control system of the present invention.

FIG. 9 is a flow chart of the main program loop of the preferred embodiment control system of the present invention.

Figure 10:
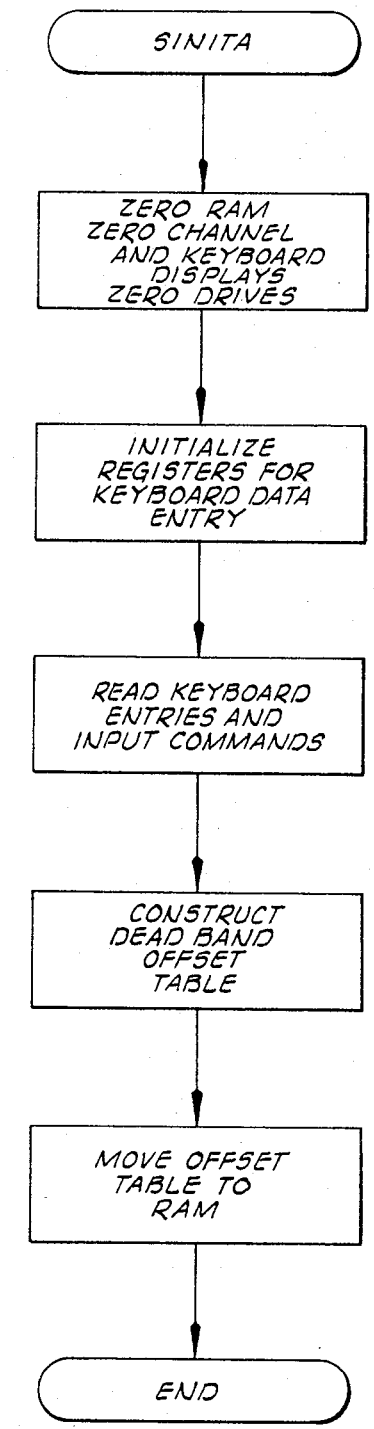

FIG. 10 is a flow chart of the subroutine SINITA of the main program loop shown in FIG. 9.

Figure 11A:
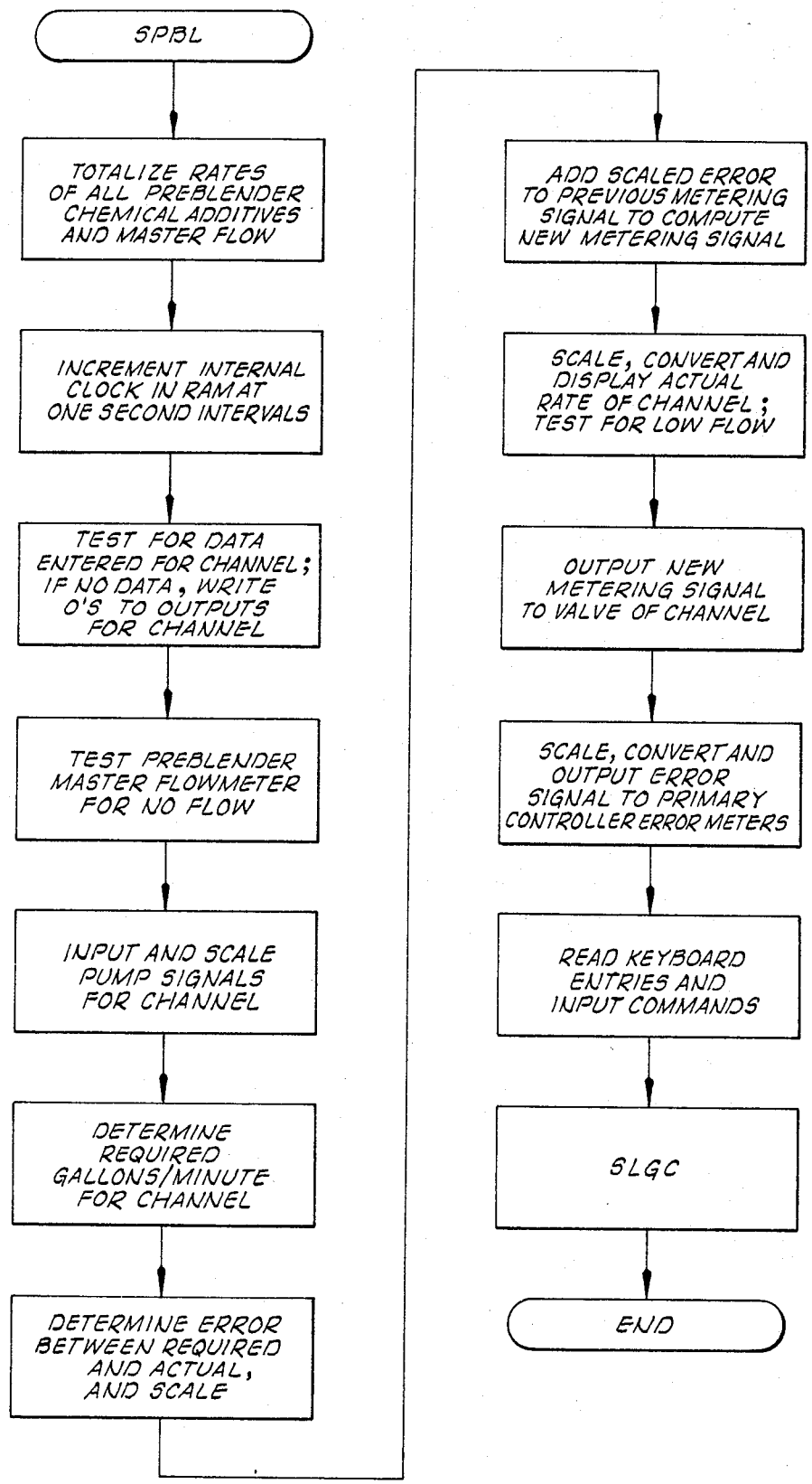

FIG. 11A is a flow chart of the subroutine SPBL of the main program loop shown in FIG. 9.

FIG. 11B is a flow chart of the subroutine SLGC of the subroutine SPBL shown in FIG. 11A.

FIG. 11C is a flow chart of the subroutine PCLGC of the subroutine SLGC shown in FIG. 11B.

Figure 12:
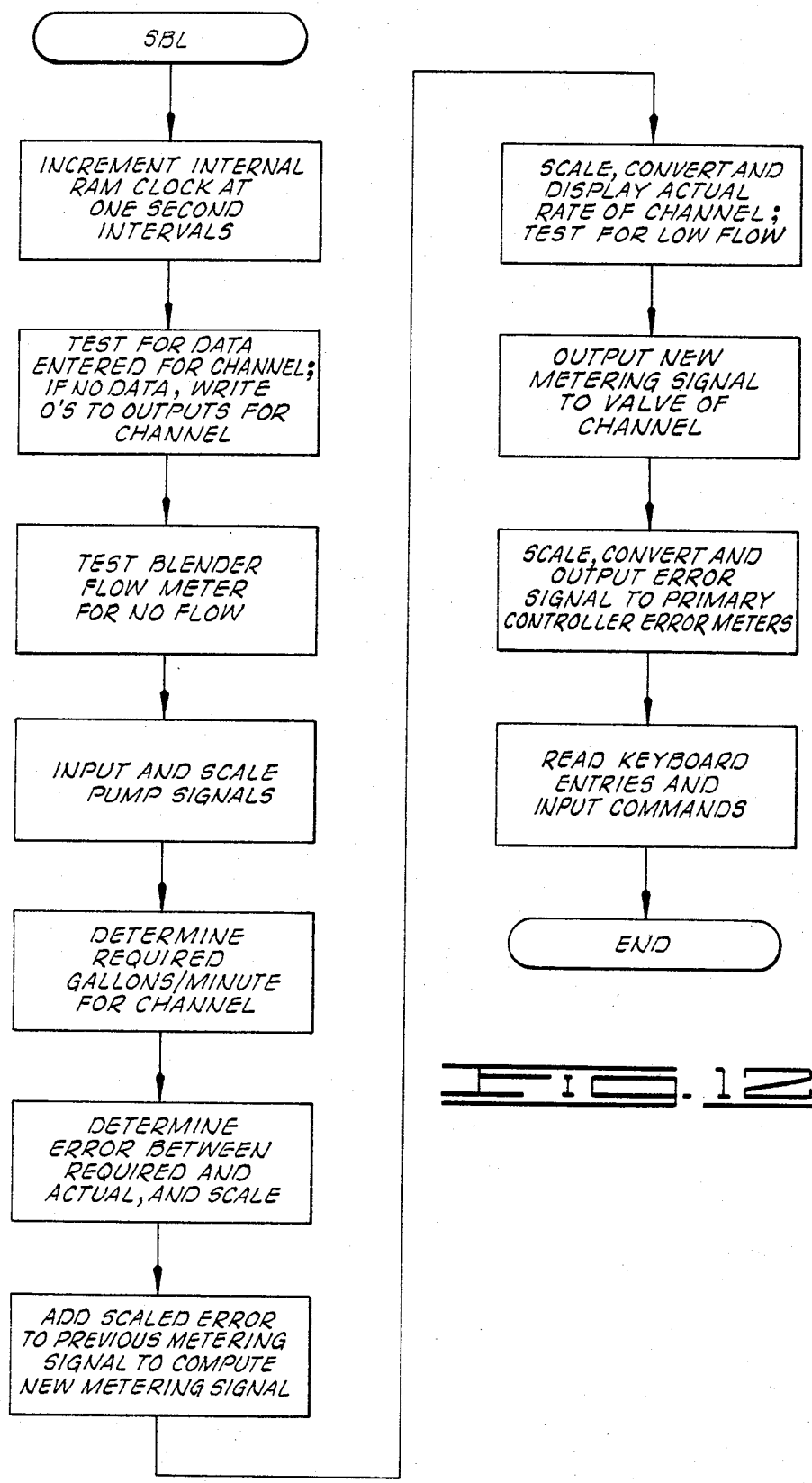

FIG. 12 is a flow chart of the subroutine SBL of the main loop program shown in FIG. 9.

With reference to the drawings, the preferred embodiment of the present invention will be described. FIG. 1 shows that the preferred embodiment includes an apparatus 2 which receives water from a water source 4 and a liquid gel concentrate from a liquid gel concentrate source 6. The apparatus 2 provides a mixture and additives to a blender apparatus 8 from which the completed fracturing fluid is pumped into a well 10 by a pump 12, such as a Halliburton HT-400 pump.

The apparatus 2 includes a main pump 14, such as a 10×10 Gorman-Rupp centrifugal pump, for pumping water from the water source 4 and additives contained on the apparatus 2 into a holding tank 16. The additives which are added into the flow established by the pump 14 include the liquid gel concentrate, a buffering agent, a clay stabilizing agent, and a surfactant of types known to the art. Examples of these substances include formic acid, BA-1, CLA-STA II, and FRACFLO. All these additives, other than the liquid gel concentrate, are maintained on the apparatus 2 in suitable containers.

The mixture pumped into the holding tank 16 is held in the holding tank for a suitable period to enable the mixture to react, such as by hydration of the gelling agent in the liquid gel concentrate, to provide a suitably yielded fracturing gel. After being held for the appropriate time, the mixture is then pumped from the holding tank 16 into a blender tub 18 of the blender apparatus 8. Sand is added to this mixture in the blender tub 18, and the resultant sand-laden mixture is pumped from the blender tub 18 for injection into the well 10. The sand-laden mixture can have additional additives added from the apparatus 2 as indicated in FIG. 1. These additional additives are shown in FIG. 1 to be a cross-linking agent and a breaker. These are retained in suitable containers on the apparatus 2. Examples of these substances include CL-11 and MYF-3C. As known to the art, it is important that the cross-linking agent and the breaker not be added to the mixture until the mixture is pumped into the well 10.

The water source 4 includes any suitable water supply which can be connected to the apparatus 2. For example, the water source 4 can include a plurality of frac tanks. For one type of job on which the apparatus can be used, it is contemplated that ten frac tanks be used to provide a 200,000 gallon reservoir of water suitable for fracturing fluid flow rates of fifteen to fifty-five barrels per minute.

The liquid gel concentrate source 6 is an appropriate source of a suitable liquid gel concentrate which can be connected to the apparatus 2. For example, liquid gel concentrate transports of types known to the art can be used.

The blender apparatus 8 illustrated in FIG. 1 is a standard blender trailer known to the art. As shown in FIG. 1, the blender apparatus 8 includes the blender tub 18 into which the mixture from the holding tank 16 is pumped by a pump 20 through an inlet line 21. The sand-laden mixture prepared in the blender tub 18 is pumped to the pump 12 by another pump 22, through an outlet line 23, also contained on the blender apparatus 8.

The apparatus 2 and the method by which the fracturing fluid is produced by the preferred embodiment of the present invention will be more fully described with reference to FIGS. 2-12.

With reference to FIGS. 2-7, the structure of the apparatus 2 will be described. FIGS. 2, 3 and 4 disclose the apparatus 2 includes a portable support means comprising a trailer 24 having a platform 26 mounted on a plurality of wheels 28 whereby the trailer 24 can be transported as known to the art.

Mounted on the trailer 24 is the pump 14. The pump 14 is part of an inlet conduit means for providing a flow path to the holding tank 16 which is also mounted on the trailer 24. The inlet conduit means of the preferred embodiment extends from a suction header 30, to which the water source 4 is connectible by suitable means, to a tank inlet 32.

The holding tank 16 also includes outlets 34 from which an outlet conduit means for providing a flow path from the holding tank 16 extends to a discharge header 36 to which the blender apparatus 8 is connectible. The holding tank 16 of the preferred embodiment has a nominal capacity of 100 barrels. The holding tank also includes a weir 38 disposed therein between the tank inlet 32 and the tank outlets 34 in a manner as known to the art.

Also mounted on the trailer 24 are the plurality of containers for holding the various liquid additives. In the preferred embodiment, the containers include five 150-gallon vertical liquid additive tanks 40, 42, 44, 46 and 48 mounted adjacent the holding tank 16. Disposed to the rear of the five vertical tanks are two 500-gallon horizontally-mounted tanks 49, 50. Mounted near the front of the trailer 24 is another 500-gallon liquid additive tank 52 horizontally disposed between the pump 14 and an engine 54, which engine provides power to the apparatus 2. In the preferred embodiment the engine 54 is a GM 4-71 diesel engine.

Associated with each of the tanks 40-52 is a connector means for providing a flow path from the respective tank either to the inlet conduit means or for connection to the blender apparatus 8. The connector means, as well as the inlet conduit means and outlet conduit means, are more clearly illustrated in the schematic drawings of FIGS. 6A-6C. In FIGS. 6B-6C the inlet conduit means is designated by the reference numeral 56 and the outlet conduit means is designated by the reference numeral 58. The connector means which connect respective tanks to the inlet conduit means 56 are designated in FIGS. 6B-6C by the reference numerals 60, 62, 64, and 66. Two additional connector means 68 and 70 are contained on the trailer 24 for connecting the liquid gel concentrate source 6 to the inlet conduit means 56. The connector means for connecting respective tanks to the discharge header 36, and thus also to the blender apparatus 8, are identified in FIG. 6C by the reference numerals 72, 74 and 76.

Each of the connector means 60-76 is constructed similarly in that each includes pump means coupled by suitable means between the respective inlets and outlets as illustrated. Each pump means has a pump 78 driven by a suitable drive means, such as a hydraulic motor 80, as illustrated for the buffering agent connector means 60. Each motor 80 is connected to a hydraulic motor power source 82 through a control valve 84. In the preferred embodiment the valve 84 is a proportional valve. Each of the pumps, motors and valves of the connector means 60-76 are of suitable types as known to the art.

It is to be noted that in FIGS. 6B-6C there are two channels by which liquid gel concentrate can be added to the water flowing through the inlet conduit means 56. These channels are defined by the connector means 68 and 70. There are likewise two channels defined by the connector means 60 and 62 through which two buffering agents can be added. Single channels are provided for the clay stabilizing agent and the surfactant. There are two channels for the cross-linking agents, and one channel for the breaker.

To control the operation of the motor 80 and pump 78 of each channel, the apparatus 2 further includes control means 81 which is responsive to the flows through the inlet conduit means 56 and the outlet conduit means 58. The control means has multiple front panels as illustrated in FIG. 5, which front panels are accessible by an operator standing on a control deck 83 of the platform 26 of the trailer 24. The control deck 83 is accessible by a ladder (not shown) or other suitable means. The control means is shown in the FIG. 6A diagram to include an automatic or digital means 85 for automatically controlling the operating rates of the pumps and motors of the channels at automatically determined rates by which preselected concentrations of the additives in the resultant fracturing fluid will be achieved. FIG. 6A also discloses that the control means includes an analog and match meter readout means 86a, 86b, and 86c for controlling the motors and pumps of each channel to pump the respective additives at manually selected rates. Either the digital means 85 or the analog means 86 can be used to control any one channel by suitably manipulating a plurality of switch means 88 contained in a termination box 90 of the preferred embodiment. The termination box 90 also connects the digital means 85 and the match meter readout means 86b and 86c to pump speed detector means, flow detector means, and pH detector means.

The pump speed detector means is shown in FIGS. 6B-6C to include individual tachometers 92 for each of the additive channels. Each tachometer 92 provides two electrical signals, one of which is connected to the digital means 85 via the termination box 90 and the other of which is connected to the match meter readout portions 86b, 86c. The electrical signals generated by the tachometers 92 are proportional to the speeds at which the respective motors 80 drive the respective pumps 78. The tachometers 92 are of suitable types as known to the art.

The preferred embodiment flow detector means includes a plurality of flow meters 94 which are disposed in coupling means or lines connecting the pumps 78 to their respective termination loci at the inlet conduit means 56 or the discharge header 36. The preferred embodiment flow detector means also includes a preblender flow meter 96 disposed in the inlet conduit means 56 for providing electrical signals proportional to the flow of the water through the flow meter 96. The flow meter detector means also includes a blender flow meter 98 which is shown in FIG. 6C to be mounted on the blender apparatus 8; however, it is to be noted that the blender flow meter 98 can also be mounted in the outlet conduit means 58 mounted on the trailer 24. The blender flow meter 98 provides a signal to the means 85 and 86, which signal is proportional to the flow rate of the fluid flowing through the outlet conduit means 58. The blender flow meter 98 signal is connected to the front panel of the control means at a suitable connector 99 as shown in FIG. 5.

The pH detector means is shown in FIGS. 5 and 6C to include a pH detector probe 100 and a pH indicating meter 102. The pH detector means is of a suitable type as known to the art, such as a TBI Model 540A pH indicator.

The digital means 85 is a microcomputer controller constructed similarly to the controller disclosed in U.S. Pat. No. 4,353,482. The microcomputer includes a CDP 1802 microprocessor and associated memory in which the operating system is contained. Flow charts of the operating system are shown in FIGS. 9–12 which will be discussed hereinbelow. The input/output structure of a representative channel of the digital means 85 is schematically shown in FIG. 7.

As described in U.S. Pat. No. 4,353,482, the digital means 85 includes a keyboard 104a by which preselectable concentration values for each additive channel can be set. When a concentration value is entered, it is displayed in a digital display means 104b (such as a liquid crystal display), with the pertinent channel number and the code indicating concentration.

The means 85 also includes a selector means 106a for directing the microcomputer to simulate the blender flow meter 98 to enable the means 85 to operate even when there is no actual output from the holding tank 16. The selector means 106a operates in association with a potentiometer having a set control knob 106b and with a calibration factor switch means 106c and associated meter display means 106d.

The means 85 also includes feed switches 105 for each channel. When a feed switch 105 is placed in an "on" position, control signals are provided for use by the valve 84 of the respective channel.

The means 85 still further includes display means 107 for each channel. In the preferred embodiment each display means includes a liquid crystal display 107a and a needle meter 107b as known to the art.

The preferred embodiment analog and match meter readout means 86 comprises the elements 86a, 86b, and 86c which are three units of the 79BI system known to the art as being used on current Halliburton Services blender trailers and trucks. The means 86 includes manual controls comprising potentiometers 108 for manually setting the electrical signals used to control each of the additive channels if the individual switches of the switch means 88 are appropriately set to electrically connect the means 86 to the respective additive channels. To properly operate, the means 86 requires an actual blender flow meter 98 signal as opposed to a simulated signal. As shown in FIG. 6A, the manual controller element 86a includes the potentiometers 108 for providing in the preferred embodiment electrical means for manually setting signals to control the additive flows at selectable rates, whereas the match meter readout units 86b and 86c include match meters 109 for displaying readings of those additive channels connected thereto via the termination box 90. The channels connected to the unit 86b are displayed relative to the preblender flow meter 96, and the channels connected to the unit 86c are displayed relative to the blender flow meter 98. A toggle switch 111 contained in the unit 86b allows for calibration of two different sizes of preblender flow meters 96 so that flow meter sizes can be changed by simply switching the position of the toggle switch.

The operating system contained in the electronic memory of the preferred embodiment digital means 85 will be described with reference to FIGS. 9–12. FIG. 9 discloses that the main program loop of the preferred embodiment comprises six primary subroutines including SINITA, PFEED, TST2, STORE CODE FOR RUN MODE, SPBL, and SBL. The subroutine SINITA is the supervisor for initialization for the apparatus 2. The subroutine PFEED checks the feed switches on the control panel (shown in FIG. 5) to determine if they are set in the feed position for each channel. The subroutine TST2 tests for the standby mode flag being set in response to the manipulation of the mode selector switch on the control panel. The subroutine SPBL is the supervisor for the preblender controlled chemicals. The subroutine SBL is the supervisor for blender controlled chemicals. The remaining subroutine stores the appropriate code for the run mode. Although not shown in FIG. 9, an additional subroutine which blanks the displays of unused channels 11, 12 and 13 is included in the preferred embodiment.

FIG. 10 is a flow chart of the subroutine SINITA. This subroutine initializes the apparatus 2 by zeroing the appropriate elements. This subroutine also initializes registers which are used for receiving data from the keyboard 104. This subroutine also retrieves the keyboard entries and other input commands. This subroutine also constructs an offset table which enables the apparatus 2 to more quickly reach an initial operating condition wherein the hydraulic deadbands of the additive metering channels are overcome. That is, the offset table is used to get around the delay which would occur on power-up due to the detection of low flows or low concentrations in each channel.

The subroutine PFEED monitors the channel feed switches 105 and sets an appropriate bit in respective software words associated with each channel. If the channel feed switch is off, the apparatus 2 continues to display on that channel's digital readout, but does not affect the drive for the channel's motor valve.

The subroutine TST2 tests for the standby mode. If the standby mode is selected via the mode selector switch 106a, the apparatus 2 outputs zeros to the valves 84 of each channel and displays zeros or totally blanks the digital displays.

The subroutine SPBL is the routine which controls the operation of each of the additive channels through which additives are input to the input conduit means 56 prior to entry into the holding tank 16. As shown in FIG. 11A, the subroutine SPBL performs several functions prior to entering a subroutine SLGC. These initial functions are repeated in five loops for monitoring and controlling the master channel which includes the input conduit means 56 and the four additive channels through which the on-trailer additives are input into the input conduit means 56.

In examining the flow chart of FIG. 11A, the step for testing the preblender master flow meter for no flow is performed to detect a minimum flow rate so that the individual channel motor valve drives are not maintained on in the event the main flow of water through the input conduit means slowly trails off.

In the "input and scale pump signals for channel" step of the subroutine SPBL, the tachometer signal from the respective channel being monitored is read.

In the next flow chart step, the required rate for each channel is determined in response both to the concentration value entered through the keyboard 104a and to the totalized rates of all the preblender chemical additives and master flow computed in the first indicated step of the subroutine SPBL.

Once the pump signals have been input and scaled and the required flow rate has been determined, the actual rate is subtracted from the required rate to determine the error. This subtraction is performed at a scale of 30th's of gallons per minute in the preferred embodiment.

To compute the new metering signal, the appropriately rescaled error signal is added to the previous metering signal used to control the valve 84 of the respective channel. FIG. 8 diagramatically illustrates the foregoing control process.

Once the five loops of the subroutine SPBL have been performed, the subroutine SLGC is entered. The preferred embodiment subroutine SLGC has a flow chart illustrated in FIG. 11B. In this subroutine, the apparatus 2 computes the required flow rate for the liquid gel concentrate and appropriately divides that between the two channels 68 and 70 schematically shown in FIGS. 6B-6C. These channels are designated 8A and 8B in the preferred embodiment computations as indicated in FIG. 11B; these designations pertain to software channels which do not have corresponding sectors on the control panel shown in FIG. 5. To display a combined total of both channels, the first three addition steps and the output step shown in FIG. 11B are performed. The appropriate totals are displayed in the digital readout of channel sector 8 of the control panel, which channel sector 8 represents the combination of software channels 8A and 8B corresponding to the channels 68 and 70 shown in FIGS. 6B-6C.

Once the totals have been computed and displayed, the subroutine SLGC enters a subroutine PCLGC having a flow chart as shown in FIG. 11C. The subroutine PCLGC performs the actual control computations for each of the liquid gel concentrate channels in a manner similar to the control computations performed for the other preblender additive channels. At the conclusion of the subroutine PCLGC, it returns to the subroutine SLGC for the additional computations shown in FIG. 11B.

FIGS. 11A and 11B disclose steps for testing for low flows. These tests are performed in response to the signals generated by each of the flow meters 94 of the preblender additive channels. The flow meter inputs are compared to a predetermined minimum value. If the flow meter inputs are below the minimum value, the letter "L" is illuminated in the respective channel's digital display to indicate a low flow condition. This is a check against the tachometer signals which might indicate that the respective channel's pump 78 is operating, but does not necessarily indicate that an actual flow is occurring in response to the operating pump.

The subroutine SBL has a flow chart as shown in FIG. 12. It operates in a fashion similar to the additive control steps of the FIG. 11 routines; however, the control steps indicated in FIG. 12 are for controlling the three blender additive channels shown in FIG. 6 to be input to the outlet line of the blender tub.

By the operation of the program shown in FIGS. 9-12 wherein one or more subroutines controls the additives flowing into the inlet conduit means 56 and another controls the additives flowing into the outlet line 23 of the blender tub 18, it can be said that the digital means 85 includes a plurality of digital means, one of which controls the additives for the inlet conduit means and another of which controls the additives for the outlet conduit means. Likewise, the analog means 86 can be said to include a plurality of analog means because of the individual potentiometers and match meter indicators for each channel.

To utilize the preferred embodiment apparatus 2 to produce a fracturing fluid for pumping into the well 10, the trailer 24 is first moved by suitable means to the well site where it is connected by suitable means to the water source 4, the liquid gel concentrate source 6, and the blender apparatus 8.

The pump 14 is actuated as known to the art to draw water from the water source 4 and flow it into the holding tank 16. During this time, the control means of the apparatus 2 properly meters the liquid gel concentrate and any of the buffering agent, surfactant, and/or clay stabilizing agent additives as desired. The control of each channel is performed by whichever one of the digital means 85 or the analog means 86 has been selected for that channel via the switches 88. If the digital means 85 is selected, then automatic control is effected by properly actuating each of the pumps 78 of the respective channels based on the rate at which the water flows through the inlet conduit means 56, the speeds at which the respective pumps are actuated, and the concentration for the respective additive as entered via the keyboard 104a of the control panel. If the analog means 86 is selected, control is effected in response to the manually set potentiometer 108 corresponding to the respective channel.

Once the mixture is in the holding tank 16, it is retained for an appropriate time to allow the necessary reaction as known to the art to occur. In the preferred embodiment it is contemplated that the mixture be retained long enough to obtain a fully yielded gel so that high concentrations of sand can be added to the mixture in the blender tub 18.

The mixture retained in the holding tank 16 is drawn therefrom upon actuation of the pump 20. The mixture is flowed into the blender tub 18 where sand is added as known to the art. Pumps 22 and 12 are then used to draw the sand-laden mixture from the blender tub 18 and inject it into the well 10. As this injection occurs, the cross-linking agent and breaker additives are added to the outlet line 23 of the blender tub 18 as appropriate. The control of the cross-linking agent and breaker additives is made in response to their respectively entered concentrations, the flow rate of the mixture into the blender tub 18 and the detected speeds of the pumps of the breaker and crosslinker additive channels.

During the operation of the apparatus 2, the respective flow rates are indicated in the displays for each channel. The flows are also indicated in the match meters contained on the control panel. The second electrical signals provided by the tachometers 92 are provided to the match meter readouts 86b and 86c as a check system against the display readings of the digital control means.

The signals from the flow meters 94 of each channel are used to determine if a low flow condition exists as previously described. If a low flow condition does exist, the aforementioned letter "L" is illuminated for that respective channel.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims.

What is claimed is:

1. An apparatus for controlling the mixing of a plurality of substances, comprising:
   portable support means for being transported;
   a holding tank mounted on said support means;
   first container means, mounted on said support means, for holding a first additive;
   second container means, mounted on said support means, for holding a second additive;
   inlet conduit means, mounted on said support means, for providing a flow path to said holding tank;
   outlet conduit means, mounted on said support means, for providing a flow path from said holding tank;
   first connector means, mounted on said support means, for providing a flow path from said first container means to said inlet conduit means;
   second connector means, mounted on said support means, for providing a flow path from said second container means; and
   control means, for controlling, in response to a flow along said inlet conduit means, the flow of said first additive from said first container means into said inlet conduit means so that a selectable amount of said first additive is added to a fluid flowing through said inlet conduit means to define a reactable mixture flowed into said holding tank, and for controlling, in response to a flow along said outlet conduit means occurring at a time after said mixture has reacted in said holding tank, the flow of said second additive from said second container means into the reacted mixture.

2. An apparatus as defined in claim 1, wherein:
   said first connector means includes first pump means for pumping said first additive from said first container means to said inlet conduit means;
   said second connector means includes second pump means for pumping said second additive from said second container means; and
   said control means includes:
      digital means for automatically controlling said first and second pump means to pump the respective additives at automatically determined rates by which preselected concentrations of said additives will be achieved;
      analog means for controlling said first and second pump means to pump the respective additives at manually selected rates;
      first switch means for selecting one of said digital means and said analog means to control said first pump means; and
      second switch means for selecting one of said digital means and said analog means to control said second pump means.

3. An apparatus for controlling the mixing of a plurality of substances, comprising:
   portable support means for being transported;
   a holding tank mounted on said support means;
   first container means, mounted on said support means, for holding a first additive;
   second container means, mounted on said support means, for holding a second additive;
   inlet conduit means, mounted on said support means, for providing a flow path to said holding tank;
   outlet conduit means, mounted on said support means, for providing a flow path from said holding tank;
   first connector means, mounted on said support means, for providing a flow path from said first container means to said inlet conduit means, said first connector means including first pump means for pumping said first additive from said first container means to said inlet conduit means, said first pump means including:
      a first pump having an inlet connected to said first container means and having an outlet connected to said inlet conduit means; and
      first drive means for driving said first pump;
   second connector means, mounted on said support means, for providing a flow path from said second container means, said second connector means including second pump means for pumping said second additive from said second container means, said second pump means including:
      a second pump having an inlet connected to said second container means; and
      second drive means for driving said second pump; and
   control means, for controlling, in response to a flow along said inlet conduit means, the flow of said first additive from said first container means into said inlet conduit means and for controlling, in response to a flow along said outlet conduit means, the flow of said second additive from said second container means for mixing with a flow including said first additive, said control means including:
      first detector means for providing a first electrical signal proportional to a speed at which said first drive means drives said first pump;
      second detector means for providing a second electrical signal proportional to a speed at which said second drive means drives said second pump;
      third detector means for providing a third electrical signal proportional to a rate at which a fluid flows through said inlet conduit means;
      fourth detector means for providing a fourth electrical signal proportional to a rate at which a mixture including said fluid and said first additive flows through said outlet conduit means;

first digital means, responsive to said first and third electrical signals, for providing a first control signal for controlling said first drive means; and second digital means, responsive to said second and fourth electrical signals, for providing a second control signal for controlling said second drive means.

4. An apparatus as defined in claim 3, wherein said control means further includes:

first analog means for providing a third control signal for controlling said first drive means to drive said first pump at a preselected rate;

second analog means for providing a fourth control signal for controlling said second drive means to drive said second pump at a preselected rate; and switch means for selectably connecting either said first control signal or said third control signal to said first drive means and for selectably connecting either said second control signal or said fourth control signal to said second drive means.

5. An apparatus as defined in claim 4, wherein:

said first detector means includes means for providing a fifth electrical signal proportional to said speed at which said first drive means drives said first pump;

said second detector means includes means for providing a sixth electrical signal proportional to said speed at which said second drive means drives said second pump; and said control means further includes match meter means, responsive to said fifth and sixth electrical signals, for visually indicating the relationships between the speeds of said first and second pumps and said preselected rates.

6. An apparatus as defined in claim 1, wherein said control means includes means for detecting the pH of a substance flowing along said inlet conduit means into said holding tank.

7. An apparatus for producing a well fracturing substance utilizing water from a water source and a liquid gel concentrate from a liquid gel concentrate source and further utilizing a blender tub having an inlet line and an outlet line, said outlet line being connectible to a well, said apparatus comprising:

a holding tank;

inlet conduit means for connecting said water source to said holding tank;

first connector means for connecting said liquid gel concentrate source to said inlet conduit means, said first connector means including first pump means for pumping said liquid gel concentrate from said liquid gel concentrate source to said inlet conduit means;

first additive container means for containing an additive including a buffering agent;

second connector means for connecting said first additive container means to said inlet conduit means, said second connector means including second pump means for pumping said buffering agent from said first additive container means to said inlet conduit means;

third pump means, disposed in said inlet conduit means, for pumping a mixture of said water, said liquid gel concentrate and said buffering agent into said holding tank;

outlet conduit means for connecting said holding tank to said blender tub;

second additive container means for containing an additional additive;

third connector means for connecting said second additive container means to said outlet line of said blender tub, said third connector means including fourth pump means for pumping said additional additive from said second additive container means to said outlet line of said blender tub; and control means for controlling said first, second and fourth pump means to pump said liquid gel concentrate and said buffering agent into said inlet conduit means and said additional additive into said outlet line of said blender in preselected proportions, said control means including:

first flow rate detector means for detecting a flow rate of said water flowing through said inlet conduit means;

second flow rate detector means for detecting a flow rate of said liquid gel concentrate flowing through said first connector means;

third flow rate detector means for detecting a flow rate of said buffering agent flowing through said second connector means;

fourth flow rate detector means for detecting a flow rate of said mixture flowing through said outlet conduit means;

fifth flow rate detector means for detecting a flow rate of said additional additive flowing through said third connector means;

first speed detector means for detecting a speed at which said first pump means operates;

second speed detector means for detecting a speed at which said second pump means operates;

third speed detector means for detecting a speed at which said fourth pump means operates;

concentration setting means for setting a liquid gel concentrate concentration value, a buffering agent concentration value and an additional additive concentration value;

first digital means, responsive to said first flow rate detector means, said second flow rate detector means, said third flow rate detector means, said first speed detector means, said second speed detector means, said liquid gel concentrate concentration value and said buffering agent concentration value, for providing a first signal for controlling said first pump means and a second signal for controlling said second pump means; and second digital means, responsive to said fourth flow rate detector means, said fifth flow rate detector means, said third speed detector means, and said additional additive concentration value, for providing a third signal for controlling said fourth pump means.

8. An apparatus as defined in claim 7, wherein said control means further includes:

first electrical means for manually setting a fourth signal proportional to a rate at which said liquid gel concentrate is to flow through said first connector means;

second electrical means for manually setting a fifth signal proportional to a rate at which said buffering agent is to flow through said second connector means;

third electrical means for manually setting a sixth signal proportional to a rate at which said additional additive is to flow through said third connector means;

first switch means for selectably connecting either said first signal or said fourth signal to said first pump means;

second switch means for selectably connecting either said second signal or said fifth signal to said second pump means; and third switch means for selectably connecting either said third signal or said sixth signal to said fourth pump means.

9. An apparatus as defined in claim 8, further comprising a portable trailer having disposed thereon said holding tank, said inlet conduit means, said first connector means, said first additive container means, said second connector means, said third pump means, said outlet conduit means, said second additive container means, said third connector means, said first flow rate detector means, said second flow rate detector means, said third flow rate detector means, said fifth flow rate detector means, said first speed detector means, said second speed detector means, said third speed detector means, said concentration setting means, said first digital means, said second digital means, said first electrical means, said second electrical means, said third electrical means, said first switch means, said second switch means, and said third switch means.

10. An apparatus as defined in claim 9, wherein:
said apparatus further comprises:
third additive container means for containing a clay stabilizing agent;
fourth connector means for connecting said third additive container means to said inlet conduit means, said fourth connector means including fifth pump means for pumping said clay stabilizing agent from said third additive container means to said inlet conduit means;
fourth additive container means for containing a surfactant;
fifth connector means for connecting said fourth additive container means to said inlet conduit means, said fifth connector means including sixth pump means for pumping said surfactant from said fourth container means to said inlet conduit means;
fifth additive container means for containing a breaker;
sixth connector means for connecting said fifth additive container means to said outlet line of said blender tub, said sixth connector means including seventh pump means for pumping said breaker from said fifth additive container means to said outlet line of said blender tub;
said additional additive includes a cross-linking agent;
said control means further includes:
sixth flow rate detector means for detecting a flow rate of said clay stabilizing agent flowing through said fourth connector means;
seventh flow rate detector means for detecting a flow rate of said surfactant flowing through said fifth connector means;
eighth flow rate detector means for detecting a flow rate of said breaker flowing through said sixth connector means;
fourth speed detector means for detecting a speed at which said fifth pump means operates;
fifth speed detector means for detecting a speed at which said sixth pump means operates; and
sixth speed detector means for detecting a speed at which said seventh pump means operates;

said concentration setting means includes means for setting a clay stabilizing agent concentration value, a surfactant concentration value and a breaker concentration value;

said first digital means is further responsive to said sixth flow rate detector means, said seventh flow rate detector means, said fourth speed detector means, said fifth speed detector means, said clay stabilizing agent concentration value and said surfactant concentration value, for providing a seventh signal for controlling said fifth pump means and an eighth signal for controlling said sixth pump means; and said second digital means is further responsive to said eighth flow rate detector means, said sixth speed detector means and said breaker concentration value, for providing a ninth signal for controlling said seventh pump means.

11. An apparatus as defined in claim 7, further comprising a portable trailer having disposed thereon said holding tank, said inlet conduit means, said first connector means, said first additive container means, said second connector means, said third pump means, said outlet conduit means, said second additive container means, said third connector means, said first flow rate detector means, said second flow rate detector means, said third flow rate detector means, said fifth flow rate detector means, said first speed detector means, said second speed detector means, said third speed detector means, said concentration setting means, said first digital means, and said second digital means.

12. An apparatus as defined in claim 7, wherein:
said apparatus further comprises:
third additive container means for containing a clay stabilizing agent;
fourth connector means for connecting said third additive container means to said inlet conduit means, said fourth connector means including fifth pump means for pumping said clay stabilizing agent from said third additive container means to said inlet conduit means;
fourth additive container means for containing a surfactant;
fifth connector means for connecting said fourth additive container means to said inlet conduit means, said fifth connector means including sixth pump means for pumping said surfactant from said fourth container means to said inlet conduit means;
fifth additive container means for containing a breaker;
sixth connector means for connecting said fifth additive container means to said outlet line of said blender tub, said sixth connector means including seventh pump means for pumping said breaker from said fifth additive container means to said outlet line of said blender tub;
said additional additive includes a cross-linking agent;
said control means further includes:
sixth flow rate detector means for detecting a flow rate of said clay stabilizing agent flowing through said fourth connector means;
seventh flow rate detector means for detecting a flow rate of said surfactant flowing through said fifth connector means;
eighth flow rate detector means for detecting a flow rate of said breaker flowing through said sixth connector means;

fourth speed detector means for detecting a speed at which said fifth pump means operates;

fifth speed detector means for detecting a speed at which said sixth pump means operates; and sixth speed detector means for detecting a speed at which said seventh pump means operates;

said concentration setting means includes means for setting a clay stabilizing agent concentration value, a surfactant concentration value and a breaker concentration value;

said first digital means is further responsive to said sixth flow rate detector means, said seventh flow rate detector means, said fourth speed detector means, said fifth speed detector means, said clay stabilizing agent concentration value and said surfactant concentration value, for providing a fourth signal for controlling said fifth pump means and a fifth signal for controlling said sixth pump means; and said second digital means is further responsive to said eighth flow rate detector means, said sixth speed detector means and said breaker concentration value, for providing a sixth signal for controlling said seventh pump means.

13. An apparatus as defined in claim 12, further comprising a portable trailer having disposed thereon said holding tank, said inlet conduit means, said first connector means, said first additive container means, said second connector means, said third pump means, said outlet conduit means, said second additive container means, said third connector means, said first flow rate detector means, said second flow rate detector means, said third flow rate detector means, said fifth flow rate detector means, said first speed detector means, said second speed detector means, said third speed detector means, said concentration setting means, said first digital means, said second digital means, said third additive container means, said fourth connector means, said fourth additive container means, said fifth connector means, said fifth additive container means, said sixth connector means, said sixth flow rate detector means, said seventh flow rate detector means, said eighth flow rate detector means, said fourth speed detector means, said fifth speed detector means, and said sixth speed detector means.

14. A method for producing a fracturing substance, comprising:

flowing water through a conduit;

actuating a first pump to flow a liquid gel concentrate into said conduit;

actuating a second pump to flow a buffering agent into said conduit;

detecting the rate said water flows through said conduit;

detecting the speed at which said first pump is actuated;

detecting the speed at which said second pump is actuated;

computing, in response to the detected rate of said water and the detected speeds of said first and second pumps, a total flow of a mixture including said water, liquid gel concentrate, and buffering agent through said conduit;

entering a first numerical value representing a concentration at which said liquid gel concentrate is to be maintained in said mixture;

entering a second numerical value representing a concentration at which said buffering agent is to be maintained in said mixture;

controlling said step of actuating said first pump in response to said total flow, said speed at which said first pump is actuated, and said first numerical value;

controlling said step of actuating said second pump in response to said total flow, said speed at which said second pump is actuated, and said second numerical value;

flowing said mixture into a holding tank;

flowing said mixture from said holding tank and into a blender tub having an outlet line through which said mixture flows;

actuating a third pump to flow an additional additive into said outlet line of said blender tub;

detecting the rate said mixture flows from said holding tank into said blender tub;

detecting the speed at which said third pump is actuated;

entering a third numerical value representing a concentration at which said additional additive is to be maintained in said fracturing substance including said mixture and said additional additive; and controlling said step of actuating said third pump in response to said rate at which said mixture flows from said holding tank into said blender tub, said speed at which said third pump is actuated, and said third numerical value.

* * * * *